(12) United States Patent
Holmström et al.

(10) Patent No.: US 9,200,345 B2
(45) Date of Patent: Dec. 1, 2015

(54) PROCESS AND PLANT FOR TREATING ORE CONCENTRATE PARTICLES CONTAINING VALUABLE METAL

(75) Inventors: Åke Holmström, Katthammarsvik (SE); Karin Lundholm, Skellefteå (SE); Gunnar Berg, Skellefteå (SE); Jochen Güntner, Kahl (DE)

(73) Assignee: Outotec Oyj, Espoo (FI)

( * ) Notice: Subject to any disclaimer, the term of this patent is extended or adjusted under 35 U.S.C. 154(b) by 197 days.

(21) Appl. No.: 13/993,652

(22) PCT Filed: Dec. 14, 2010

(86) PCT No.: PCT/FI2010/051022
§ 371 (c)(1),
(2), (4) Date: Jun. 12, 2013

(87) PCT Pub. No.: WO2012/080558
PCT Pub. Date: Jun. 21, 2012

(65) Prior Publication Data
US 2013/0291684 A1    Nov. 7, 2013

(51) Int. Cl.
*C22B 1/02*    (2006.01)
*C22B 1/10*    (2006.01)
(Continued)

(52) U.S. Cl.
CPC . *C22B 1/02* (2013.01); *B01D 53/52* (2013.01); *B01D 53/64* (2013.01); *B01D 53/76* (2013.01);
(Continued)

(58) Field of Classification Search
CPC ............ C22B 1/02; C22B 1/10; C22B 11/02; C22B 15/0013; C22B 5/08; C22B 5/12; B01D 53/52; B01D 53/64; B01D 53/76; F27B 15/00; F27B 15/09; F27B 15/12
See application file for complete search history.

(56) References Cited

U.S. PATENT DOCUMENTS 3,791,812 A    2/1974    Frank et al.
4,919,715 A    4/1990    Smith et al.
(Continued)

FOREIGN PATENT DOCUMENTS

AU    650783    6/1994
WO    WO 9013679 A  * 11/1990
(Continued)

OTHER PUBLICATIONS

K.G. Thomas & A.P. Cole "Roasting developments—especially oxygenated roasting," Developments in Mineral Processing, vol. 15, 2005, pp. 403-432.
(Continued)

*Primary Examiner* — George Wyszomierski
*Assistant Examiner* — Tima M McGuthry Banks
(74) *Attorney, Agent, or Firm* — Chernoff, Vilhauer, McClung & Stenzel, LLP

(57) ABSTRACT

A process and a plant for treating ore concentrate particles containing valuable metal and having at least arsenic and sulfur containing components. The process comprises a two-stage roasting process comprising a first roasting step and a second roasting step. A gas mixture is formed from the first process gas component obtained from the first roasting step and from the second process gas component obtained from the second roasting step. Post combustion of the gas mixture is made in a post combustion chamber that uses the sulphide rich first process gas component and the second process gas component as oxidizer gas in order to decompose $SO_3$ in the gas mixture. The exit gas is exposed to subsequent gas cooling and dust removal steps.

27 Claims, 1 Drawing Sheet

(51) Int. Cl.
*C22B 11/02* (2006.01)
*C22B 15/00* (2006.01)
*C22B 5/08* (2006.01)
*C22B 5/12* (2006.01)
*B01D 53/52* (2006.01)
*B01D 53/64* (2006.01)
*B01D 53/76* (2006.01)
*F27B 15/00* (2006.01)
*F27B 15/09* (2006.01)
*F27B 15/12* (2006.01)
*C22B 11/00* (2006.01)

(52) U.S. Cl.
CPC ... *C22B 1/10* (2013.01); *C22B 5/08* (2013.01); *C22B 5/12* (2013.01); *C22B 11/00* (2013.01); *C22B 11/02* (2013.01); *C22B 15/0013* (2013.01); *F27B 15/00* (2013.01); *F27B 15/09* (2013.01); *F27B 15/12* (2013.01); *B01D 2251/11* (2013.01); *B01D 2258/025* (2013.01)

(56) References Cited

U.S. PATENT DOCUMENTS 5,123,956 A 6/1992 Fernandez et al.
6,482,373 B1 11/2002 Hannaford et al.

FOREIGN PATENT DOCUMENTS

WO WO 2006042898 A1 * 4/2006 ............... C22B 7/02
WO 2010003693 A1 1/2010

OTHER PUBLICATIONS

J. Hammerschmidt, J. Guntner, & B. Kerstiens, "Roasting of gold ore in the circulating fluidized-bed technology," Develoments in Mineral Processing, vol. 15, 2005, pp. 433-453.
International Search Report for PCT/FI2010/051022, completed Sep. 7, 2011 and mailed Sep. 9, 2011, 3 pages.

* cited by examiner

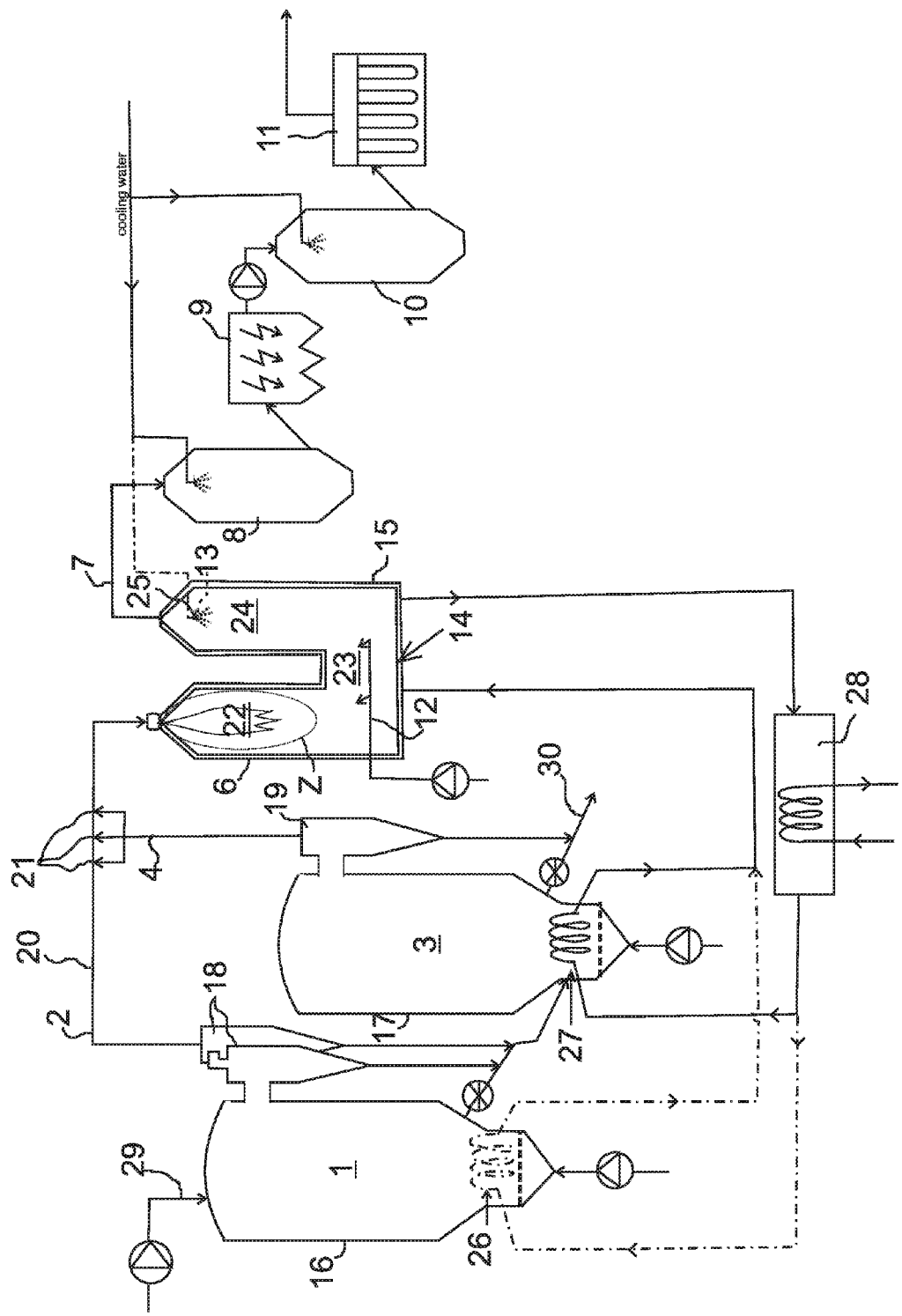

ical Application No. PCT/FI2010/051022
PROCESS AND PLANT FOR TREATING ORE CONCENTRATE PARTICLES CONTAINING VALUABLE METAL

CROSS-REFERENCE TO RELATED APPLICATION

This is a national stage application filed under 35 USC 371 based on International Application No. PCT/FI2010/051022 filed Dec. 14, 2010.

FIELD OF INVENTION

The present invention relates to a process and a plant for treating ore concentrate particles containing a valuable metal and having at least arsenic and sulfur containing components. More specifically, the invention relates to the off-gas handling and treatment in said process and plant.

BACKGROUND OF INVENTION

Known technique in the art is depicted e.g. in the articles "Roasting developments—especially oxygenated roasting, Developments in Mineral Processing, Volume 15, 2005, Pages 403-432 K. G. Thomas, A. P. Cole", "Roasting of gold ore in the circulating fluidized-bed technology Developments in Mineral Processing, Volume 15, 2005, Pages 433-453, J. Hammerschmidt, J. Guntner, B. Kerstiens", and patent documents WO2010/003693, U.S. Pat. No. 6,482,373, AU 650783, U.S. Pat. No. 4,919,715.

Copper and gold concentrates containing arsenic are preferably processed by dearsenifying roasting before further treatment by smelting in a copper plant or cyanide leaching.

The dearsenifying roasting is made by controlling the oxygen potential during arsenic volatilization to maintain iron both as magnetite and pyrrhotite. The calcine is thereafter further processed by conventional matte smelting in case the raw material consists of a copper containing concentrate. Gold rich calcine are often processed by cyanide leaching but the leaching is only efficient, if the calcine is dead roasted or sulphating roasted. A conventional method to treat arsenic rich gold concentrates is therefore a two stage roasting process whereby both stages consist of fluidized beds.

The first fluidized bed is the dearsenifying step, operating at a very low oxygen potential, and the second fluidized bed is the dead roasting or sulphating step, operating with an excess of oxygen.

The process gas leaving the dearsenifying roasting will contain sulphur rich gas compounds such as elementary sulphur, hydrogen sulphide and arsenic sulphide while the process gas leaving the second oxidizing roasting will contain oxygen and oxidized compounds like $SO_3$.

The roasting process gas is normally further processed by separation of calcine and process gas in cyclones, post combustion, gas cooling and dust cleaning in electrostatic precipitator and possibly bag filter and finally conversion of $SO_2$ to sulphuric acid.

Known problems in the further processing are:
The forming of accretions which could fall down and damage equipment or block gas passage. The accretions are e.g. formed due to local under cooling of the process gas or on cold surfaces in the equipment.
Condensation of arsenic on cold surfaces which will form said accretions.
Condensation of acid mist on cold surfaces which will cause corrosion and contribute to formation of accretion.
If the acid mist quantity is high, the cost for effluent treatment will also be high.
Heat recovery of the system has often been limited to the production of saturated steam which is less favourable for the production of electric energy.

These problems were solved before in the following ways:
The post combustion air can for instance be added at the cyclone exit. However, in some cases the post combustion can cause accretions in gas ducts and this is more likely if the combustion is made with a large amount of air in ambient temperature.

The forming of accretions on cold surfaces in the equipment is normally solved by the use of preheated air, which requires separate heating equipment with increased investment cost and operating costs (maintenance and possibly heating fuel). Forming of accretions in the equipment is normally avoided by insulating the equipment well so that no cold surfaces exist, although it is also accepted that accretions will form where the insulation is damaged or not properly done.

Gas cooling during two-stage roasting can either be made by direct cooling with water injection in a cooling tower or through indirect cooling through cooling coils in the fluidized beds and by conventional steam boiler. Lead and arsenic contents in the concentrate and $SO_3$ concentration in process gas influence suitable cooling method, since these elements can cause formation of accretions on cooling surfaces.

Example of compounds that forms accretions are elemental lead at cooling coils in the first dearsenifying stage and $SO_3$ or arsenic trioxide at the boiler tubes of the steam boiler. It is today generally accepted that high $SO_3$ concentrations cause higher cost in the effluent treatment plant.

Corrosion of the equipment is normally avoided by insulating the equipment well so that no or little $SO_3$ condensation occurs, although it is also accepted that corrosion will occur over time and for example where the insulation is damaged or not properly done. It would be best to be able to avoid high $SO_3$ concentrations in the process gas. This is today, to some extent, done by controlling the process with modern control systems. Further reductions would be an advantage.

Heat recovery in form of steam is today done by steam generation coils in the fluidised bed itself often without any superheating. A normal steam boiler is sometimes used in the process gas stream, but with similar risks of accretions forming and corrosion as described.

OBJECT OF INVENTION

The object of the invention is to eliminate the above mentioned drawbacks.

A particular object of the invention is to provide a process and plant wherein the risk of corrosion and forming of accretions are reduced during post combustion and down-stream in the gas cleaning system. Further, an object of the invention is to provide a process and plant wherein $SO_3$ concentration in the process gas can be reduced and the risk of corrosion damages by $SO_3$ is reduced. Further, an object of the invention is to provide a process and plant wherein the effluent handling costs are reduced. Further, an object of the invention is to reduce the total process gas volume which saves both investment cost and operating costs

SUMMARY OF INVENTION

The invention concerns a process for treating ore concentrate particles containing valuable metal and having at least arsenic and sulfur containing components. The process comprises roasting the concentrate partiles in a first roasting step operating with a low oxygen potential for dearsenifying the concentrate. The off-gas leaving the first roasting step is treated to separate calcine and a sulphide rich first process gas component. Further, the process comprises roasting the calcine led from the first roasting step in a second roasting step operating with an excess of oxygen. The off-gas leaving the second roasting step is treated to separate calcine and a second process gas component. Further the process comprises post combustion of the process gas component and treating the process gas in subsequent gas cooling and dust removal steps.

In accordance with the invention the process further comprises forming of a gas mixture of the first process gas component and the second process gas component which is oxygen containing warm oxidizer gas, and post combustion of said gas mixture in a post combustion chamber, said post combustion operating with said reducing and sulphide rich first process gas component and said second gas component as oxidizer, in order to decompose $SO_3$ in the gas mixture to reduce the $SO_3$ content in the exit gas exiting post combustion chamber and to reduce the risk of accretion formation and corrosion in the post combustion chamber and in subsequent steps. Finally the process comprises exposing the exit gas to subsequent gas cooling and dust removal steps.

In an embodiment of the process additional post combustion air is inserted into the post combustion chamber after main post combustion reaction zone to avoid $SO_3$ formation.

In an embodiment of the process residence time of the gas in the post combustion chamber is arranged to be long enough to ensure complete combustion of all easily oxidized compounds, such as hydrogen sulphide, elemental sulphide, arsenic sulphide, elemental arsenic, present in the gas mixture.

In an embodiment of the process the long enough residence time is provided by arranging a sufficient volume of the post combustion chamber.

In an embodiment of the process the process comprises a step of controlling the temperature in the post combustion chamber.

In an embodiment of the process the step of controlling the temperature in the post combustion chamber includes direct injection of cooling water into the post combustion chamber.

In an embodiment of the process the step of controlling the temperature in the post combustion chamber includes indirect cooling of the walls of the post combustion chamber with steam to keep the temperature of the walls of the post combustion chamber above the condensation temperature of $As_2O_3$ or $SO_3$.

In an embodiment of the process said indirect cooling is implemented by a radiation cooler formed by a double shell structure of the walls of the post combustion chamber the steam flowing within the double shell structure of the wall whereby hot gas within the chamber by radiation converts saturated steam to superheated steam.

In an embodiment of the process heat is recovered from the superheated steam for internal or external use of energy.

In an embodiment of the process the first roasting step is implemented in a first fluidized bed reactor and the second roasting step is implemented in a second fluidized bed reactor.

In an embodiment of the process the process includes extracting heat from the fluidized bed of the first fluidized bed reactor.

In an embodiment of the process the process includes extracting heat from the fluidized bed of the second fluidized bed reactor.

In an embodiment of the process the off-gas leaving the first roasting step is separated by at least one first cyclone separator.

In an embodiment of the process the off-gas leaving the second roasting step is separated by at least one second cyclone separator.

In an embodiment of the process the second process gas component which is mixed with the first process gas component, is hot, preferably the temperature of the second process gas component is about 650 . . . 700° C., to ensure fast reaction with the first process gas component.

In an embodiment of the process the additional combustion air is preheated to at least 200° C., preferably by the heat extracted from air cooled conveyors or calcine coolers.

In an embodiment of the process the calcine is completely roasted in the second roasting step.

In an embodiment of the process the valuable metal is any of platinum-group metals, gold, silver, copper or zinc.

The invention also concerns a plant for treating ore concentrate particles containing valuable metal and having at least arsenic and sulfur containing components. The plant comprises a first roasting reactor operating with a low oxygen potential for dearsenifying the concentrate and a first separator arranged to receive off-gas from the first roasting reactor and to separate from said off-gas calcine and a sulphide rich first process gas component. Further, the plant comprises a second roasting reactor arranged to receive calcine from the first roasting reactor and from the first separator, said second roasting reactor operating with an excess of oxygen, and a second separator arranged to receive off-gas from the second roasting reactor and to separate from said off-gas calcine and a second process gas component. Moreover, the plant comprises means for post combustion of the process gas component and gas cooling and dust removal equipment for further treating the process gas.

In accordance with the invention the plant further comprises means for forming a gas mixture of the first process gas component and the second process gas component which is oxygen containing warm oxidizer gas. Said means for post combustion includes a post combustion chamber for post combustion of said gas mixture, said post combustion chamber operating with said reducing and sulphide rich first process gas component and said second process gas component as oxidizer, in order to decompose $SO_3$ in the gas mixture to reduce the $SO_3$ content in the exit gas exiting post combustion chamber and to reduce the risk of accretion formation and corrosion in the post combustion chamber and in subsequent gas cooling and dust removal equipment.

In an embodiment of the plant the plant comprises a first pipeline for guiding the first process gas component from the first separator to the post combustion chamber, and that the means for forming the gas mixture comprises a plurality of connections at several positions along the first pipeline for introducing the second process gas component via said connections into the stream of the first process gas component.

In an embodiment of the plant the post combustion chamber comprises a first chamber part forming a reaction chamber to which the gas mixture is fed; a second chamber part comprising means for inserting additional combustion air; and a third chamber part from which the gas exits from the post combustion chamber.

In an embodiment of the plant the post combustion chamber comprises cooling means for controlling the temperature in the chamber.

In an embodiment of the plant the cooling means comprises a water spraying nozzle for injecting cooling water into the post combustion chamber for direct cooling.

In an embodiment of the plant the cooling means comprises a radiation cooler formed by a double shell structure of the walls of the post combustion chamber for indirect cooling of the walls of the post combustion chamber with steam streaming between the shells.

In an embodiment of the plant the plant comprises a first heat exchanger for extracting heat from the fluidized bed of the first fluidized bed reactor.

In an embodiment of the plant the plant comprises a second heat exchanger for extracting heat from the fluidized bed of the second fluidized bed reactor.

In an embodiment of the plant the plant comprises a third heat exchanger for recovering heat from the superheated steam generated by the radiation cooler for internal or external use of energy.

The advantage of the invention is that it solves accretion problems during post combustion and downstream in the gas cleaning system as well as gas cooling during post combustion. The risk for corrosion damages caused by $SO_3$ is also reduced. The suggested mixing of the process gases reduces the amount of $SO_3$, thus reducing corrosion risks and costs for effluent treatment. The suggested mixing of the process gases gives a cost-free pre-heated post combustion gas (oxygen containing). Only a minor part needs, possibly, to be heated in another way. The pre-eating gives no forming of accretions neither in the post combustion chamber nor in the following equipment without the need for extra, costly, pre-heating equipment. The suggested post combustion unit makes it possible to insert steam-superheating coils after the post combustion unit without the risk for forming of accretions or corrosion by $SO_3$. The system can superheat steam without the need of external steam superheating (separately fired superheater). The production of steam and superheating is well balanced to the need for process gas cooling, this will avoid a costly and complicated control systems (as needed for an external superheater).

LIST OF DRAWINGS

The accompanying drawing, which is included to provide a further understanding of the invention and constitutes a part of this specification, illustrates an embodiment of the invention and together with the description helps to explain the principles of the invention.

FIGURE is a schematic flow sheet of one embodiment of a process and plant according to the invention.

DETAILED DESCRIPTION OF INVENTION

The flow sheet in FIGURE shows a two stage roasting plant with its off-gas handling system. This process layout is suitable when the raw material is an arsenic contaminated sulfide ore concentrate which valuable particles contain precious metals like gold and silver. Copper and zinc can also be present in large or small quantities. The concentrate is fed at the inlet 29 to the first roasting step 1 which is implemented in a first roasting reactor 16. The first roasting reactor 16 is a first fluidized bed reactor. The first roasting step 1 is a dearsenifying step operating at a very low oxygen potential. A first cyclone separator is arranged to receive process gas with a lot of calcine from the first roasting reactor 16 and to separate from said process gas the calcine and a sulphide rich first process gas component 2 with less calcine. The calcine contains the valuable metals and has a low content of arsenic. The first process gas component 2 leaving the dearsenifying roasting contains sulphur rich gas compounds such as elementary sulphur, hydrogen sulphide and arsenic sulphide.

A second roasting reactor 17 is arranged to receive calcine from the first roasting reactor 16 and from the first separator 18. The second roasting step 3 is made in a second roasting reactor 17 which is the second fluidized bed reactor wherein the calcine is completely roasted, ie. dead roasted or sulfating roasted, and it operates with an excess of oxygen. The meaning of dead roasted or sulfating roasted material is that all sulfide sulfur has been removed and any remaining sulfur consists of sulfates. A second cyclone separator 19 is arranged to receive process gas from the second roasting reactor 17 and to separate from said process gas calcine and a second process gas component 4. The second process gas component 4 leaving the second oxidizing roasting will contain oxygen and oxidized compounds like $SO_3$.

The calcine from the second roasting reactor 17 and from the second cyclone separator 19 is fed via outlet to further processing of the calcine, cooling, leaching etc. (not shown in FIGURE).

The plant and the process further comprises means for forming a gas mixture of the first process gas component 2 and the second process gas component 4 which is oxygen containing warm oxidizer process gas.

The means for forming a gas mixture may be arranged so that a plurality of connections 21 is arranged at several positions along the first pipeline 20 which leads the first process gas component 2 from the first separator 18 to the post combustion chamber 6. The second process gas component 4 may be introduced via said plurality of connections 21 into the stream of the first process gas component 2. This improves mixing and reduces combustion time.

The second process gas component 4 is hot, typically 650-700° C., which ensures a fast reaction with the roaster gas. When warm additional post combustion air 12 is used, air cooled conveyors (not shown in FIGURE) or calcine coolers (not shown in FIGURE) could be used as air preheaters to preheat the air to approximately 200° C.

Post combustion of the gas mixture is implemented in a post combustion chamber 6. The post combustion chamber 6 operates with said reducing and sulphide rich first process gas component 2 and said second process gas component 4 and, if needed, with warm air 12. Conditions during post combustion, e.g. an increased gas temperature and presence of reducing gas components, will make it possible to decompose $SO_3$ and thus reduce the $SO_3$ content in process gas at the post combustion exit 7. This is an important feature since it will reduce the risk of acid condensation and the subsequent formation of sticky dust, especially in the conditioning tower 10 and bag filter 11 that operate close to or below the $SO_3$ dew point.

The post combustion chamber 6 comprises a first chamber part 22 forming a reaction chamber to which the gas mixture is fed. Further the post combustion chamber comprises a second chamber part 23 having means for inserting additional combustion air 12. Additional post combustion air 12 is inserted into the post combustion chamber 6 after main post combustion reaction zone Z to avoid $SO_3$ formation. The gas exits from the post combustion chamber 6 via a third chamber part 24. The exit gas 7 exiting the post combustion chamber 6 is led to conventional gas cooling and dust removal steps 8 to 11, which may include leading the exit gas 7 via a cooling tower 8 to an electrostatic precipitator 9 and then to a bag filter 11.

The post combustion chamber 6 must have such a volume that the residence time is long enough to ensure complete combustion of all easily oxidized compounds present in the gas mixture, e.g. hydrogen sulphide, elemental sulphide, arsenic sulphide and elemental arsenic.

The reaction temperature during post combustion is increased due to exothermic reactions but must be controlled to avoid over-heating since that should cause formation of partially melted and sticky material in the post combustion chamber 6.

The temperature control of post combustion is either made by direct injection of cooling water 13 via a water spraying nozzle 25 into the post combustion chamber 6 or by indirect cooling of walls 15 of the post combustion chamber 6 by means of steam superheating or by a combination of both.

Direct injection of cooling water 13 is used when no energy recovery is included in the roaster flow sheet while indirect steam cooling is used when energy recovery 28 is included.

Direct water injection in combination with indirect cooling steam cooling can be necessary to control the flame temperature during combustion to avoid formation of sticky material. The indirect steam cooling in the post combustion walls 15 will serve three purposes, the walls will be warm enough so that no accretions will form or corrosion occur, and the walls will be cold enough to avoid overheating of both the walls and the post combustion gas and at the same time produce superheated steam.

The indirect cooling means comprises a radiation cooler 14 formed by a double shell structure of the walls 15 of the post combustion chamber 6 for indirect cooling of the walls of the post combustion chamber with steam streaming between the shells. The walls 15 may be made of cooling panels that by radiation from the hot gas inside the chamber 6 converts saturated steam within the walls 15 to superheated steam. By using steam can be ensured that the wall temperature of the post combustion chamber 6 doesn't drop to levels where condensation could form at the walls.

It is also possible to have indirect steam cooling, partly or only, by inserting superheating coils into the gas stream in the third part 24 of the post combustion chamber 6 or in the following gas duct. As the $SO_3$ concentration is reduced, any metallic lead vapour in the roaster gas has been oxidized to non-condensing lead compounds like PbO and the process gas has a temperature that is controlled at a level giving no or little sticky materials in the post combustion chamber. Correct insulation of the post combustion chamber would then be needed.

If lead free concentrates are treated, a first heat exchanger 26 may be provided to extract heat from the fluidized bed of the first fluidized bed reactor 16 (steam circuit shown with dot-and-dash line in FIGURE), and a second heat exchanger 27 for extracting heat from the fluidized bed of the second fluidized bed reactor 17 (steam circuit shown with a solid line in FIGURE). The heat exchangers 26 and 27 may be steam coils 26, 27 with the same superheating possibilities as described above.

If lead containing concentrates are roasted, only the second fluidized bed reactor 17 can be provided with the steam coil 27, because lead vapour would condensate on the steam coil 26 in the first reactor 16 which would cause accretions and harm the roasting operation. In that case heat is extracted only from the fluidized bed of the second fluidized bed reactor 17.

Preferably the superheated steam generated by the radiation cooler 14 is led via a third heat exchanger 28 for recovering heat from the superheated steam for internal use in the process itself, e.g. steam heating of leaching tanks, and/or external use of energy. The external use may include e.g. production of electric energy by a turbine.

It is obvious to a person skilled in the art that with the advancement of technology, the basic idea of the invention may be implemented in various ways. For example, although a two-stage roasting process has been described, it should be understood that the process may include more than two, e.g. three or more, roasting stages, and, respectively, the plant may include more than two, e.g. three or more, roasting reactors. The invention and its embodiments are thus not limited to the examples described above, instead they may vary within the scope of the claims.

The invention claimed is:

1. A process for treating ore concentrate particles containing valuable metal and having at least arsenic and sulfur containing components, which process comprises:
    roasting the concentrate particles in a first roasting step that creates first off-gas and operates with a low oxygen potential for dearsenifying the concentrate,
    treating the first off-gas leaving the first roasting step to separate calcine and a sulfide-rich first process gas component,
    roasting the calcine led from the first roasting step in a second roasting step that creates second off-gas and operates with an excess of oxygen, and
    treating the second off-gas leaving the second roasting step to separate calcine and a second process gas component,
    wherein the process further comprises
    forming a gas mixture of the first process gas component and the second process gas component, the gas mixture comprising oxygen-containing oxidizer gas, and
    post combustion of said gas mixture in a post combustion chamber, said post combustion operating to react said sulfide-rich first process gas component with said second process gas component, which acts as oxidizer gas, thereby decomposing any $SO_3$ in the gas mixture, and
    exposing exit gas from said post combustion chamber to subsequent gas cooling and dust removal steps.

2. The process according to claim 1, wherein additional post combustion air is inserted into the post combustion chamber to avoid $SO_3$ formation.

3. The process according to claim 2, wherein the additional post combustion air is preheated to at least 200° C.

4. The process according to claim 1, wherein the gas mixture is resident within the post combustion chamber for a time sufficient to ensure complete combustion of any of the following compounds present in the gas mixture: hydrogen sulfide, elemental sulfide, arsenic sulfide, and elemental arsenic.

5. The process according to claim 4, wherein the time that the gas mixture is resident within the post combustion chamber is selected by arranging a sufficient volume of the post combustion chamber.

6. The process according to claim 1, wherein the process comprises a step of controlling the temperature in the post combustion chamber.

7. The process according to claim 6, wherein the step of controlling the temperature in the post combustion chamber includes direct injection of cooling water into the post combustion chamber.

8. The process according to claim 6, wherein the step of controlling the temperature in the post combustion chamber includes indirect cooling of at least one wall of the post combustion chamber with steam to prevent condensation of at least one of $As_2O_3$ and $SO_3$.

9. The process according to claim 8, wherein said indirect cooling is implemented by a radiation cooler formed by a double shell structure of the post combustion chamber, the steam flowing within the double shell structure whereby heated gas within the chamber converts saturated steam to superheated steam by radiation.

10. The process according to claim 9, wherein heat is recovered from the superheated steam for internal or external use of energy.

11. The process according to claim 1, wherein the first roasting step is implemented in a first fluidized bed reactor and the second roasting step is implemented in a second fluidized bed reactor.

12. The process according to claim 11, wherein the process includes extracting heat from the fluidized bed of the first fluidized bed reactor.

13. The process according to claim 11, wherein the process includes extracting heat from the fluidized bed of the second fluidized bed reactor.

14. The process according to claim 1, wherein the off-gas leaving the first roasting step is separated by at least one first cyclone separator.

15. The process according to claim 1, wherein the off-gas leaving the second roasting step is separated by at least one second cyclone separator.

16. The process according to claim 1, wherein the second process gas component which is mixed with the first process gas component is about 650 . . . 700° C.

17. The process according to claim 1, wherein in a second roasting step the calcine is completely roasted.

18. The process according to claim 1, wherein the valuable metal is any of platinum-group metals, gold, silver, copper or zinc.

19. A plant for treating ore concentrate particles containing valuable metal and having at least arsenic and sulfur containing components, which plant comprises:
a first roasting reactor that creates first off-gas and operates with a low oxygen potential for dearsenifying the concentrate,
a first separator arranged to receive said first off-gas from the first roasting reactor and to separate from said off-gas calcine and a sulfide-rich first process gas component,
a second roasting reactor arranged to receive calcine from the first roasting reactor and from the first separator, said second roasting reactor that creates second off-gas and operates with an excess of oxygen,
a second separator arranged to receive said second off-gas from the second roasting reactor and to separate, from said second off-gas, calcine and a second process gas component,
a post combustion chamber, and
gas cooling and dust removal equipment,
wherein the first process gas component and the second process gas component are mixed in the plant to form a mixture having an oxygen-containing oxidizer gas; and where the post combustion chamber uses said sulfide-rich first process gas component and uses said second process gas component as oxidizer in order to decompose any $SO_3$ in the gas mixture.

20. The plant according to claim 19, wherein the plant comprises a first pipeline for guiding the first process gas component from the first separator to the post combustion chamber, and a plurality of connections at several positions along the first pipeline for introducing the second process gas component via said connections into the first process gas component.

21. The plant according to claim 19, wherein the post combustion chamber comprises a first chamber part forming a reaction chamber to which the gas mixture is fed; a second chamber part into which additional combustion air is inserted; and a third chamber part from which the gas exits from the post combustion chamber.

22. The plant according to claim 19, wherein the post combustion chamber has a selectively controllable temperature.

23. The plant according to claim 22, including a water spraying nozzle for injecting cooling water into the post combustion chamber for direct cooling.

24. The plant according to claim 22, wherein the cooling means comprises a radiation cooler formed by a double shell structure of the post combustion chamber for indirect cooling of at least one wall of the post combustion chamber with steam streaming between the shells.

25. The plant according to claim 19, wherein the plant comprises a first heat exchanger for extracting heat from a fluidized bed of a first fluidized bed reactor.

26. The plant according to claim 19, wherein the plant comprises a second heat exchanger for extracting heat from a fluidized bed of a second fluidized bed reactor.

27. The plant according to claim 19, wherein the plant comprises a third heat exchanger for recovering heat from superheated steam generated by a radiation cooler for internal or external use of energy.

\* \* \* \* \*